FREQUENCY MODULATING CIRCUIT UTILIZING VARIABLE CAPACITY DIODES

Filed March 6, 1967

2 Sheets-Sheet 1

FREQUENCY MODULATING CIRCUIT UTILIZING VARIABLE CAPACITY DIODES

United States Patent Office 3,409,845

Patented Nov. 5, 1968

3,409,845

FREQUENCY MODULATING CIRCUIT UTILIZING VARIABLE CAPACITY DIODES

Masaka Ogi, Tokyo, Tadashi Sekizawa, Sagamihara-shi, and Tatsusaburo, Shimoyamada, Kawasaki-shi, Japan, assignors to Fujitsu Limited, Kawasaki, Japan, a corporation of Japan Filed Mar. 6, 1967, Ser. No. 620,994

Claims priority, application Japan, Mar. 7, 1966, 41/14,175

5 Claims. (Cl. 332—30)

ABSTRACT OF THE DISCLOSURE

A frequency modulating circuit deviates a frequency out of oscillator with a modulation voltage. The rate of deviation of the modulation frequency relative to the modulation voltage constitutes the differential characteristic. A first variable capacity diode is connected in the resonant circuit of the frequency modulating circuit and operates at a point approximately equal to the maximum value of the differential characteristic of the modulation frequency. A second variable capacity diode is connected in the resonant circuit and operates at a point approximately equal to the minimum value of the differential characteristic of the modulation frequency. The first and second variable capacity diodes are connected in a manner whereby their differential characteristics compensate each other so that when an input signal is supplied to the first and second variable capacity diodes an output signal is derived from the resonant circuit having a differential characteristic which is linear over a wide range.

The present invention relates to a frequency molulating circuit. More particularly, the invention relates to a frequency modulating circuit utilizing variable capacity diodes.

Variable capacity diodes, including hyper-abrupt variable capacity diodes, are known. Such diodes may be, for example, Varipico diodes.

Frequency modulating circuits are known which utilize variable capacity diodes. In such circuits, the change of the frequency of self-oscillation is utilized by connecting the variable capacity diode to the resonant circuit of the self-excited oscillator. The modulation signal is applied between the electrodes of the variable capacity diode, thereby changing the capacity of said variable capacity diode.

The impurity density ratio of the barrier portion of a hyper-abrupt type variable capacity diode may be varied and a suitable impurity density distribution may be provided. The capacity variation factor $n$ may be varied when the capacity C is related to the voltage V in the proportion $C \alpha V^{-n}$.

The known frequency modulating circuits utilizing the variable frequency diodes produce a modulated signal having a differential characteristic which is not linear over as wide a range as desired. Although a number of variable capacity diodes may be utilized in a single frequency modulating circuit, in an effort to obtain a sufficiently wide band linear differential characteristic, a plurality of undesirable peaks are produced on the differential characteristic or the linear characteristic of the frequency.

The principal object of the present invention is to provide a new and improved frequency modulating circuit utilizing variable capacity diodes. The frequency modulating circuit of the present invention provides a modulated signal having a differential characteristic which is linear over a wide range, and therefore has an exceptionally linear frequency characteristic over a wider band than known frequency modulating circuits of similar type. The frequency modulating circuit of the present invention has excellent frequency linearity over an extremely wide made and is efficient, effective and reliable in operation, as well as being simple in structure. The frequency modulating circuit of the present invention is especially suitable for use in communications systems and as a sweep signal generator, and the like.

In accordance with the present invention, the rate of deviation of the modulation frequency relative to the modulation voltage constitutes the differential characteristic. The differential characteristic has a maximum value and a minimum value. A first variable capacity diode is connected in the resonant circuit of the frequency modulating circuit and operates at a point approximately equal to the maximum value of the differential characteristic of the modulation frequency. A second variable capacity diode is connected in the resonant circuit and operates at a point approximately equal to the minimum value of the differential characteristic of the modulation frequency. The first and second variable capacity diodes are connected in a manner whereby their differential characteristics compensate each other. An input supplies an input signal to the first and second variable capacity diodes. An output derives from the resonant circuit an output signal having a differential characteristic which is linear over a wide range.

The input may include a modulation level regulator for regulating the level of the modulation voltage. The resonant circuit comprises the first variable capacity diode connected in a first series circuit arrangement with a first capacitor. The second variable capacity diode is connected in a second series circuit arrangement with a second capacitor. The first and second series circuit arrangements are connected in parallel with each other. An inductor is connected in parallel with the first and second series circuit arrangements. The input comprises a first and second input terminal. A first inductor is connected between the first input terminal and a common point in the series circuit arrangement between the first variable capacity diode and the first capacitor. A second inductor is connected between the second input terminal and a common point in the second series circuit arrangement between the second variable capacity diode and the second capacitor. In the first series circuit arrangement, the cathode of the first variable capacity diode is connected to the first capacitor, and in the second series circuit arrangement, the cathode of the second variable capacity diode is connected to the second capacitor. The anodes of the first and second variable capacity diodes are connected to each other.

In accordance with the present invention, a method of providing a differential characteristic which is linear over a wide range from the resonant circuit of a frequency modulating circuit comprising a first variable capacity diode and a second variable capacity diode, the rate of deviation of the modulation frequency relative to the modulation voltage constituting the differential characteristic, such differential characteristic having a maximum value and a minimum value, comprising operating the first variable capacity diode at a point approximately equal to the maximum value of the differential characteristic of the modulation frequency. The second variable capacity diode is operated at a point approximately equal to the minimum value of the differential characteristic of the modulation frequency. The first and second variable capacity diodes are connected in a manner whereby their differential characteristics compensate each other. An input signal is supplied to the first and second variable capacity diodes. An output signal having a differential characteristic which is linear over a wide range is derived from the resonant circuit. The level of the modulation voltage is regulated prior to supplying the input signal to the first and second variable capacity diodes.

In order that the present invention may be readily carried into effect, it will now be described with reference to the accompanying drawings, wherein.

Figure 1:
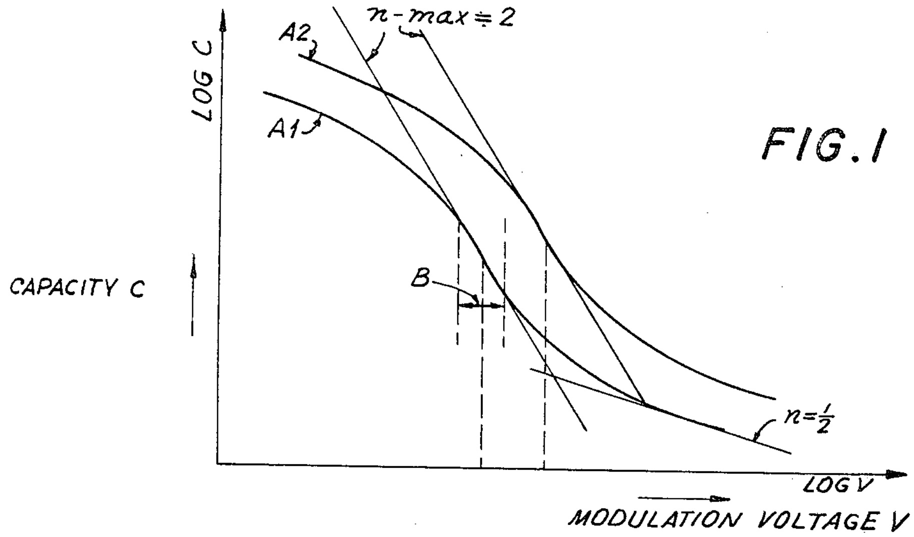
FIG. 1 is a graphical presentation of the voltage-capacity characteristics of hyper-abrupt type variable capacity diodes.

In FIG. 1, the abscissa represents the modulation voltage V, and more specifically the logarithm of the modulated voltage, and the ordinate represents the capacity C of the variable capacity diodes, more particularly the logarithm of such capacity. The voltage versus capacity characteristic is thus illustrated in FIG. 1 for two variable capacity diodes having different capacity variation factors. As shown in FIG. 1, the capacity variation factor of the hyper-abrupt type variable capacity diode approaches the capacity variation factor of an ordinary type variable capacity diode which has a capacity variation factor $n$ of one-half, when the modulation voltage is low and when such voltage is high; the capacity variation factor varies between the high and low voltage points. If the maximum slope of the capacity variation factor $n$ is denoted the maximum capacity variation factor $n$-max., then $n$-max. is 2 in the curve A1 of FIG. 1.

In FIG. 1, the curve A1 represents the voltage-capacity characteristic of a first variable capacity diode and the curve A2 represents the voltage-capacity characteristic of a second variable capacity diode. When the first variable capacity diode is utilized in a known frequency modulating circuit, the variation of the modulation frequency with the modulation voltage becomes $f \alpha V^{n/2}$. It is then necessary that $n$ equal 2 in order for the frequency to vary linearly with the voltage. As is evident from the curve A1 in FIG. 1, however, the range which satisfies the capacity variation factor $n$ equals 2 is quite narrow, and is, indeed, the range B indicated in FIG. 1. The narrowness of the range required for the linear frequency versus voltage relationship is the reason for the non-suitability of the variable capacity diodes in known frequency modulation circuits which are required to transmit a wide band.

Figure 2:
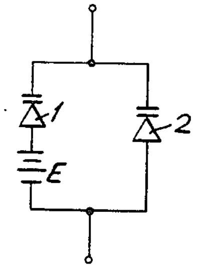
FIG. 2 PRIOR ART
FIG. 2 is a circuit diagram of a known frequency modulating circuit utilizing hyper-abrupt type variable capacity diodes.

Due to the problem of the narrowness of the range for providing a capacity variation factor $n$ equal to 2, two variable capacity diodes having the same capacity variation factor $n$ have been utilized in a frequency modulating circuit, as shown in FIG. 2. The point of operation of a first variable capacity diode 1 is shifted from the point of operation of a second variable capacity diode 2. This is accomplished by applying a bias voltage E on the first variable capacity diode 1 in order to widen the range in which the common capacity variation factor $n$ is constant. The differential characteristics of the frequency modulating circuit of FIG. 2 are shown in FIG. 3.

Figure 3:
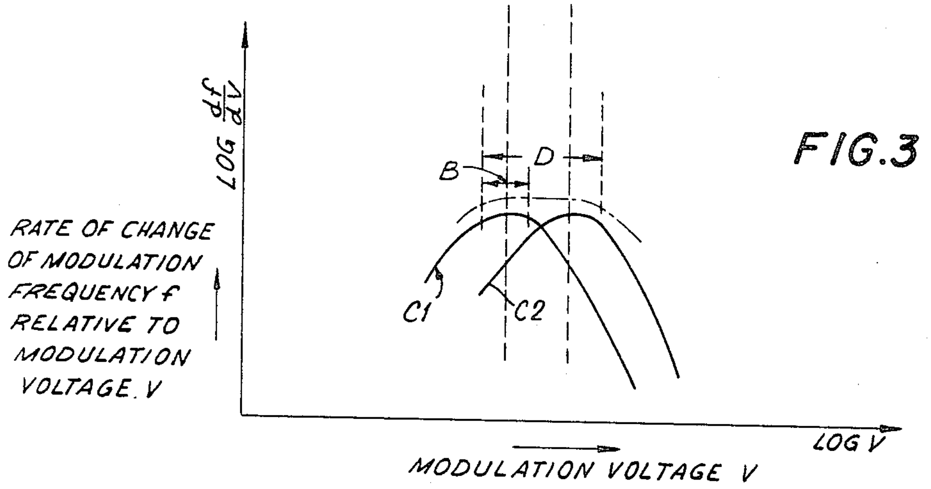
FIG. 3 is a graphical presentation of the differential characteristics of the frequency modulating circuit of FIG. 2.

In FIG. 3, the abscissa represents the modulation voltage V, and more particularly the logarithm of such modulation voltage, and the ordinate represents the rate of change of the modulation frequency $f$ relative to the modulation voltage V, or more particularly the logarithm of such rate of change. In FIG. 3, the curve C1 represents the differential characteristic of the first variable capacity diode 1 of FIG. 2 and the curve C2 represents the differential characteristic of the second variable capacity diode 2 of FIG. 2. The ordinate of FIG. 3 is determined by differentiating the variation $df$ of the modulation frequency relative to the variation $dV$ of the modulation voltage in order to permit an indication of the linearity of the frequency variation versus the voltage variation of the frequency modulating circuit of FIG. 2. In FIG. 3, the range of linearity D of the frequency modulating circuit of FIG. 2, utilizing two variable capacity diodes, is considerably wider than the range of linearity B, which is the range of linearity of a single variable capacity diode, as shown in FIGS. 1 and 3.

Figure 4:
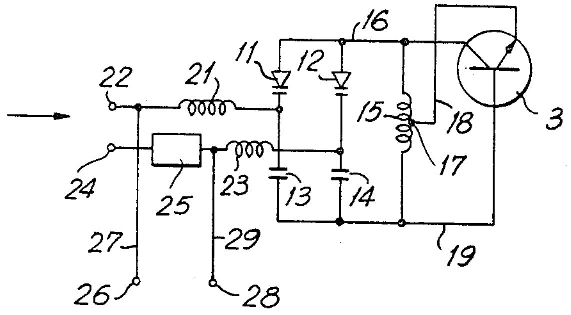
FIG. 4 is a circuit diagram of an embodiment of the frequency modulating circuit of the present invention.

FIG. 4 illustrates the frequency modulating circuit of the present invention. As oscillating transistor 3 has an emitter electrode, a collector electrode and a base electrode. The resonant circuit comprises a first variable capacity diode 11, a second variable capacity diode 12, a first DC blocking capacitor 13, a second DC blocking capacitor 14 and an inductor 15. The first variable capacity diode 11 is connected in a first series circuit arrangement with the first capacitor 13. The second variable capacity diode 12 is connected in a second series circuit arrangement with the second capacitor 14. The inductor 15, the first series circuit arrangement and the second series circuit arrangement are connected in parallel with each other.

The collector electrode of the transistor 3 is connected in common to one end of the inductor 15 and to the anode of each of the first and second variable capacity diodes 11 and 12 via a lead 16. The emitter electrode of the transistor 3 is connected to a point 17 on the inductor 15 via a lead 18. The base electrode of the transistor 3 is connected in common to the other end of the inductor 15 and to each of the first and second DC blocking capacitors 13 and 14 via a lead 19.

A first choke coil 21 is connected between an input terminal 22 and a common point in the first series circuit arrangement between the first variable capacity diode 11 and the first capacitor 13. A second choke coil 23 is connected between an input terminal 24 and a common point in the second series circuit arrangement between the second variable capacity diode 12 and the second capacitor 14. A level regulator 25 may be connected in series between the input terminal 24 and the second choke coil 23 for regulating the level of the modulating voltage V. The DC bias for the first variable capacity diode 11 is applied via a first bias terminal 26 and a lead 27 to a common point in the connection between the input terminal 22 and the first choke 21. The DC bias for the second variable capacity diode 12 is applied via a second bias terminal 28 and a lead 29 to a common point in the connection between the input terminal 24 and the second choke 23. The common point between the input terminal 24 and the second choke 23 is located between the level regulator 25 and said second choke when said level regulator is included in the circuit.

An input signal is supplied to the first and second variable capacity diodes 11 and 12 via the input terminals 22 and 24. The application of the input signal to the input terminals 22 and 24 varies the capacities of the first and second variable capacity diodes 11 and 12. This varies the resonant frequency of the resonant circuit so that the frequency modulating circuit provides at said resonant circuit a frequency modulated signal modulated by the input signal.

If the level regulator 25 is included in the circuit, the input signal is supplied to the second variable capacity diode 12 via said level regulator, so that said level regulator varies the modulation voltage V supplied to said second variable capacity diode. The variation of the modulation voltage applied to the second variable capacity diode 12 enables the variation of the modulation sensitivity, the magnitude of the distortion and the average capacity in a manner whereby the differential characteristics of the first and second variable capacity diodes compensate each other by causing the characteristics of said second diode to correspond with the characteristics of said first diode, thereby producing exceptionally good linearity over a considerably wide band or range.

Although the modulation voltage level applied to the second variable capacity diode 12 may be varied by the level regulator 25, the differential characteristics of the frequency modulation in the two variable capacity diodes may be compensated completely with respect to the modulation sensitivity and the distortion without utilizing said level regulator, in a manner hereinafter described. Although two varable capacity diodes are included in the frequency modulating circuit of FIG. 4, more than two variable capacity diodes may be included in the circuit in series or in parallel connection, in accordance with the basic principle of the present invention, and will further expand the wide range of linearity of the differential characteristic.

Figure 5:
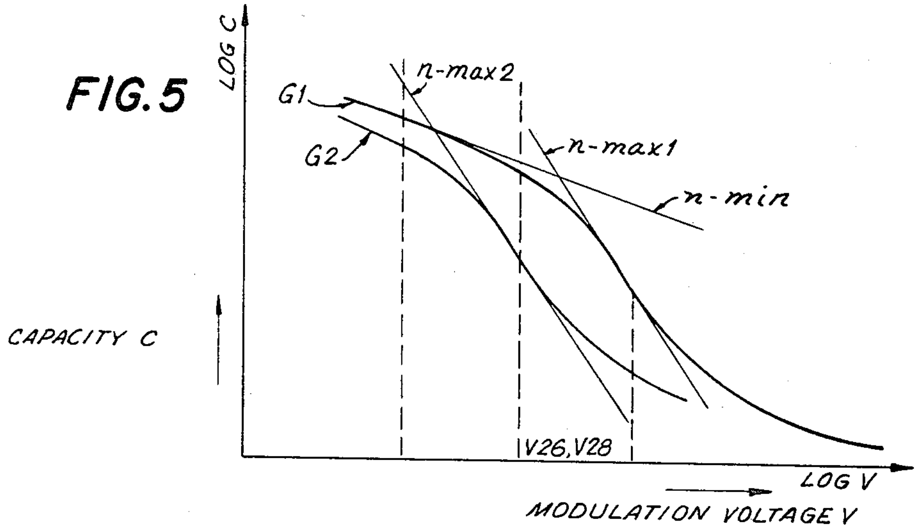
FIG. 5 is a graphical presentation of the voltage-capacity characteristics of hyper-abrupt type variable capacity diodes utilized in the frequency modulating circuit of the present invention.

In FIG. 5, the abscissa represents the modulation voltage V, and more specifically the logarithm of the modulation voltage, and ordinate represents the capacity C of the variable capacity diodes of the frequency modulating circuit of FIG. 4, and more specifically the logarithm of said capacity. The voltage versus capacity characteristic is thus illustrated in FIG. 5 for the two variable capacity diodes 11 and 12 of the frequency modulating circuit of FIG. 4. The voltage versus capacity characteristic of the first variable frequency diode 11 is indicated by the curve G1 and such characteristic for the second variable capacity diode 12 is indicated by the curve G2.

Figure 6:
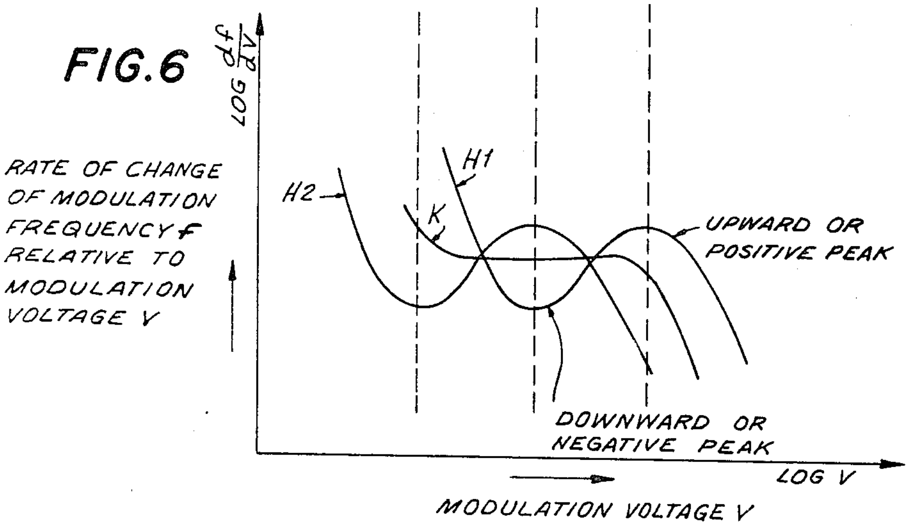
FIG. 6 is a graphical presentation of the differential characteristics of the frequency modulating circuit of the present invention.

In FIG. 6, the abscissa represents the modulation voltage V, and more particularly the logarithm of said modulated voltage, and the ordinate represents the rate of change of the modulation frequency $f$ relative to the modulation voltage V, and more particularly the logarithm of the rate of change. In FIG. 6, the curve H1 represents the differential characteristic of the first variable capacity diode 11 of FIG. 4 and the curve H2 represents the differential characteristics of the second capacity diode 12 of FIG. 4. The ordinate of FIG. 6 is determined by differentiating the variation $df$ of the modulation frequency relative to the variation $d$V of the modulation voltage in order to indicate the linearity of the frequency variation versus the voltage variation of the frequency modulating circuit of FIG. 4.

In FIG. 6, when the capacity variation factor $n$ shifts from $n$-min. to $n$-min. via $n$-max. corresponding to the variation of the modulation voltage, a downward or negative peak is produced at a point where the capacity variation factor $n$ becomes more than a fixed value (theoretically speaking $n=2$, and an upward or positive peak is produced at a point where the capacity variation factor $n$ becomes less than a certain value when shifting from $n$-max to $n$-min, as shown by the curves H1 and H2. In actual operation, however, the peaks are shifted due to the effect of the stray capacity and other disturbances in the circuit. If the bias voltages of the first and second variable capacity diodes 11 and 12 are suitably set as indicated in FIG. 5, and if one of the variable capacity diodes is operated at a point at its positive peak and the other of the variable capacity diodes is operated at a point at the negative peak, the frequency variations of the two variable capacity diodes are as follows:

(1) First diode 11: $f1=f0+a1V+a3V^3$ (2) Second diode 12: $f2=f0+a'1V+a'3V^3$ If the capacity of the voltage V applied to the first variable capacity diode 11 is C1V and if the capacity of the voltage across the second variable capacity diode 12 is C2V and the inductance of the resonant circuit is L, the oscillation frequency of the self-excited oscillator, which functions as the frequency modulating circuit of FIG. 4, is (3)
$$f1=\frac{1}{2\pi\sqrt{LC1V}}$$

(4)
$$f2=\frac{1}{2\pi\sqrt{\frac{L}{k}C2V}}$$

where $k=C1(0)/C2(0)$, and $$f0=\frac{1}{2\pi\sqrt{LC1(0)}}=\frac{1}{2\pi\sqrt{\frac{L}{k}C2(0)}}$$

From Equations 1 and 3, $$C1V=\frac{1}{4\pi^2L}(f0+a1V+a3V^3)^{-2}$$

$$=C1(0)\left(1+\frac{a1}{f0}V+\frac{a3}{f0}V^3\right)^{-2}$$

Generally, in a frequency modulating circuit $$\frac{a1}{f0}V+\frac{a3}{f0}V^3\ll 1$$

so that $$C1V=C1(0)\left(1-2\frac{a1}{f0}V-2\frac{a3}{f0}V^3\right)$$

Similarly, $$C1V=C2(0)\left(1-2\frac{a'1}{f0}V+2\frac{a'3}{f0}V^3\right)$$

When the circuit arrangement of FIG. 4 is utilized, with the first and second variable capacity diodes 11 and 12 connected in parallel, the capacities C1V and C2V are added. Thus, $$C1V\pm C2V=C1(0)\left[1+k-\frac{2}{f0}(a1+ka'1)-\frac{2}{f0}(a3-ka'3)\right]$$

The total oscillation frequency $f$ is then $$f=\frac{1}{2\pi\sqrt{\frac{L}{1+k}(C1V+C2V)}}$$

and $$f=\frac{\sqrt{1+R}}{2\pi\sqrt{L}}\left\{\frac{C1(0)}{1+k}\left[1-\frac{2}{(1+k)f0}(a1+ka'1)V-\frac{2}{(1+k)f0}(a3-ka'3)V^3\right]\right\}^{-1/2}$$

Thus, $$f=f0\left(1+\frac{1}{1+k}\cdot\frac{a1+ka'1}{f0}\cdot V+\frac{1}{1+k}\cdot\frac{a3-ka'3}{f0}\cdot V^3\right)$$

and $$f=f0+\frac{a1+ka'1}{1+k}V+\frac{a3-ka'3}{1+k}V^3$$

Therefore, if $$a3=ka'3$$

then $$f=f0+\frac{a1+ka'1}{1+k}V$$

and the frequency modulating circuit of the present invention, as shown in FIG. 4, provides a differential characteristic with excellent linearity over a considerably wide band. Thus, the overall characteristic provided by utilizing both variable capacity diodes 11 and 12 in parallel connection is, as indicated by the curve K of FIG. 6, of excellent linearity over a considerably wide band. The average or mean capacity of the point of operation of the variable capacity diodes, the modulation sensitivity and the magnitude of distortion or curvature determine the variation of the magnitudes $a3$ and $ka'3$. The variable capacity diode utilized in the frequency modulating circuit of FIG. 4, however, should satisfy the relation $a3=ka'3$.

The variable capacity diode which operates at a point which is approximately equal to the maximum value of the differential characteristic of the modulation frequency and the variable capacity diode which operates at a point which is approximately equal to the minimum value of the differential characteristic of the modulation frequency, in accordance with the present invention, and as utilized in FIG. 4, have approximately the same average or mean capacity. This is not an absolute requirement of the present invention, however. Generally, it is difficult to provide variable capacity diodes which satisfy the relation $a3=ka'3$. It is possible, however, to satisfy such relation by variation of the modulation voltage V applied to the first and second variable capacity diodes 11 and 12. The level regulator 25 may thus be utilized to satisfy the relation $a3=ka'3$ and thereby to provide excellent linearity over a considerably wide band in the frequency modulating circuit of FIG. 4.

The differential characteristics of the frequency modulation in the two variable capacity diodes may be compensated completely with respect to the modulation sensitivity and the distortion without utilizing the level regulator 25. This may be accomplished by operating one of the variable capacity diodes at a point approximately equal to the maximum value of the differential characteristic and operating the other of the variable capacity diodes at a point approximately equal to the minimum value of the differential characteristic of the modulation frequency. This eliminates the necessity for the level regulator 25 if the variable capacity diodes satisfy the relation $a3=ka'3$ and thereby compensate each other completely with respect to the modulation sensitivity and the distortion. In other words, the differential characteristics utilized are those which are symmetrical to each other with respect to the horizontal axis.

While the invention has been described by means of specific examples and in a specific embodiment, we do not wish to be limited thereto, for obvious modifications will occur to those skilled in the art without departing from the spirit and scope of the invention.

We claim:

1. A frequency modulating circuit for modulating an input signal with a modulation voltage at a modulation frequency, the rate of change of said modulation frequency relative to said modulation voltage constituting the differential characteristic, said differential characteristic having a maximum value and a minimum value, said frequency modulating circuit comprising:

resonant circuit means;

a first variable capacity diode connected in said resonant circuit means and operating at a point approximately equal to the maximum value of the differential characteristic of the modulation frequency;

a second variable capacity diode connected in said resonant circuit means and operating at a point approximately equal to the minimum value of the differential characteristic of the modulation frequency, said first and second variable capacity diodes being connected in a manner whereby their differential characteristics compensate each other;

input means for supplying an input signal to said first and second variable capacity diodes; and output means for deriving from said resonant circuit means an output signal having a differential characteristic which is linear over a wide range.

2. A frequency modulating circuit as claimed in claim 1, wherein said input means includes modulation level regulating means for regulating the level of said modulation voltage.

3. A frequency modulating circuit as claimed in claim 1, wherein said resonant circuit means comprises said first variable capacity diode connected in a first series circuit arrangement with a first capacitor, said second variable capacity diode connected in a second series circuit arrangement with a second capacitor, said first and second series circuit arrangements being connected in parallel with each other, and an inductor connected in parallel with said first and second series circuit arrangements.

4. A frequency modulating circuit as claimed in claim 3, wherein said input means comprises a first input terminal, a first inductor connected between said first input terminal and a common point in said first series circuit arrangement between said first variable capacity diode and said first capacitor, a second input terminal and a second inductor connected between said second input terminal and a common point in said second series circuit arrangement between said second variable capacity diode and said second capacitor.

5. A frequency modulating circuit as claimed in claim 4, wherein each of said first and second vairable capacity diodes has an anode and a cathode and in said first series circuit arrangement the cathode of said first variable capacity diode is connected to said first capacitor and in said second series circuit arrangement the cathode of said second variable capacity diode is connected to said second capacitor, the anodes of said first and second variable capacity diodes being connected to each other.

References Cited

UNITED STATES PATENTS

| | | | |
|---|---|---|---|
| 3,290,618 | 12/1966 | Leysieffer | 332—30 |
| 3,333,215 | 7/1967 | Israel | 334—15 |

JOHN KOMINSKI, *Primary Examiner.*